US009950558B1

(12) United States Patent
Nguyen

(10) Patent No.: US 9,950,558 B1
(45) Date of Patent: Apr. 24, 2018

(54) APPARATUS AND METHOD FOR SUPPORTING A DECORATIVE PANEL

(71) Applicant: Timothy Nguyen, Carrollton, TX (US)

(72) Inventor: Timothy Nguyen, Carrollton, TX (US)

(73) Assignee: Timothy Nguyen, Grand Prairie ( * ) Notice: Subject to any disclaimer, the term of this patent is extended or adjusted under 35 U.S.C. 154(b) by 50 days.

(21) Appl. No.: 15/256,814

(22) Filed: Sep. 6, 2016

Related U.S. Application Data

(62) Division of application No. 14/467,873, filed on Aug. 25, 2014, now Pat. No. 9,447,630.

(60) Provisional application No. 61/869,336, filed on Aug. 23, 2013.

(51) Int. Cl.
*B32B 3/06* (2006.01)
*B44C 5/02* (2006.01)
*A47G 1/16* (2006.01)

(52) U.S. Cl.
CPC .............. *B44C 5/02* (2013.01); *A47G 1/1653* (2013.01)

(58) Field of Classification Search
CPC ..... Y10T 428/24008; B32B 3/06; E06B 7/28; G09F 7/18
See application file for complete search history.

(56) References Cited

U.S. PATENT DOCUMENTS

2009/0047535 A1* 2/2009 Crilly .................... E06B 3/7001 428/542.6

* cited by examiner

*Primary Examiner* — Alexander Thomas
(74) *Attorney, Agent, or Firm* — Whitaker Chalk Swindle & Schwartz PLLC; Stephen S. Mosher

(57) ABSTRACT

An apparatus and method for detachably supporting a decorative or graphic panel or covering upon a frame or door without leaving a mark or other visible evidence of the presence of the panel. The panel may be used to install a decorative panel on a door or a decorative image on a frame to be hung on a wall, for example. Specially designed corner supports are attached to the panel and looped over the respective corners of the door or frame. The decorative image or graphic may be applied to the visible face of the panel or covering by any practical process.

11 Claims, 4 Drawing Sheets

APPARATUS AND METHOD FOR SUPPORTING A DECORATIVE PANEL

CROSS REFERENCE TO RELATED APPLICATIONS

The present U. S. Patent Application is a Divisional Application of U.S. patent application Ser. No. 14/467,873 filed Aug. 25, 2014, entitled APPARATUS AND METHOD FOR SUPPORTING A DECORATIVE PANEL, now U.S. Pat. No. 9,447,630, which claims priority from the earlier filed provisional application Ser. No. 61/869,336, filed Aug. 23, 2013, entitled "Apparatus and Method for Supporting a Decorative Sheet."

BACKGROUND OF THE INVENTION

Field of the Invention

The present invention generally relates to fixed decorative or graphic panels or signs and more particularly to apparatus and a method for supporting such decorative panel on a frame or door as a decorative feature.

Background of the Invention and Description of the Prior Art

Doors in buildings are often limited to purely utilitarian applications and, except for attributes such as a finish or features formed in relief, or the inclusion of window glass, are not often thought of as being decorative or even attractive. A door, unless it is fitted with window glass, adds little to the visual aspects of an enclosed architectural space. Certainly a door can be decorated as by painting it with a graphic image or attaching posters or other like attachments to the surface of the door. A problem with these is that they typically result in a permanent change to the door, or to damage from the use of fasteners for attaching the poster to the door. Such damage must be repaired to restore the door to its original condition upon removal of the attachments.

The utility of a door could be enhanced if a way could be found to provide a removable way to removably cover or decorate a door that in no way leaves any mark or sign that it had been decorated or covered by some decorative attachment. The invention described herein provides apparatus and a method to solve this need.

SUMMARY OF THE INVENTION

Accordingly there is provided a detachable panel for a frame having substantially right angle corners, said frame defining a perimeter enclosing a generally planar area and adapted to be installed in or upon a wall or free-standing support. The decorative panel may comprise a sheet material dimensioned to occupy a forward or rearward facing side of the door or frame and its enclosed area. An attachment device may be disposed at each corner of the sheet material and adapted to detachably secure each corner of the sheet material to a respective corner of the door or frame. The preferred attachment device comprises an elastic strap diagonally disposed across and behind each corner of the door or frame. The elastic strap may be attached to the back side of each corner of the sheet material at each end thereof, such that the centerline of the strap intersects both adjacent sides of the sheet material at approximately one-half of a right angle. The length of the strap along its centerline between the intersections of the strap with the sheet material is preferably no greater than the distance between the intersections plus the thickness of said frame. Depending on the elasticity of the elastic strap material, the length of the strap may be adjusted accordingly.

In another embodiment of the invention a method is provided for supporting a decorative panel upon a door or frame having right angle corners, comprising the steps of: (1) select a suitable door or frame having right angle corners and measure its width, length, and thickness; (2) select a material for the panel from the group consisting of a thin, flexible material; (3) prepare the decorative panel to attach it to the door or frame including the steps of (a) shaping the outline of each side of the panel as a slightly outwardly curved line; (b) adding a margin to the outline to allow for hemming the panel if the panel is formed of a fabric or paper material; (c) cutting the material along the outline; and (d) folding the margin at each corner to form a mitered corner and hemming each edge of the panel; (4) select a flat, elastic strap material having a width approximately equal to at least ⅓ the thickness of the door or frame; and (5) attach to the backside of the panel at each corner thereof a length of the elastic strap, disposed at an approximate angle of 45 degree degrees with both sides of the door or frame adjoining the corner, each the end of the strap attached along a stitching across each end thereof to the panel, the stitching of each end inset approximately ¼ inch and parallel with each side of said panel, wherein the length of the strap is sufficient to form a stretched loop around each respective corner of door or frame.

DETAILED DESCRIPTION OF THE INVENTION

Figure 1:
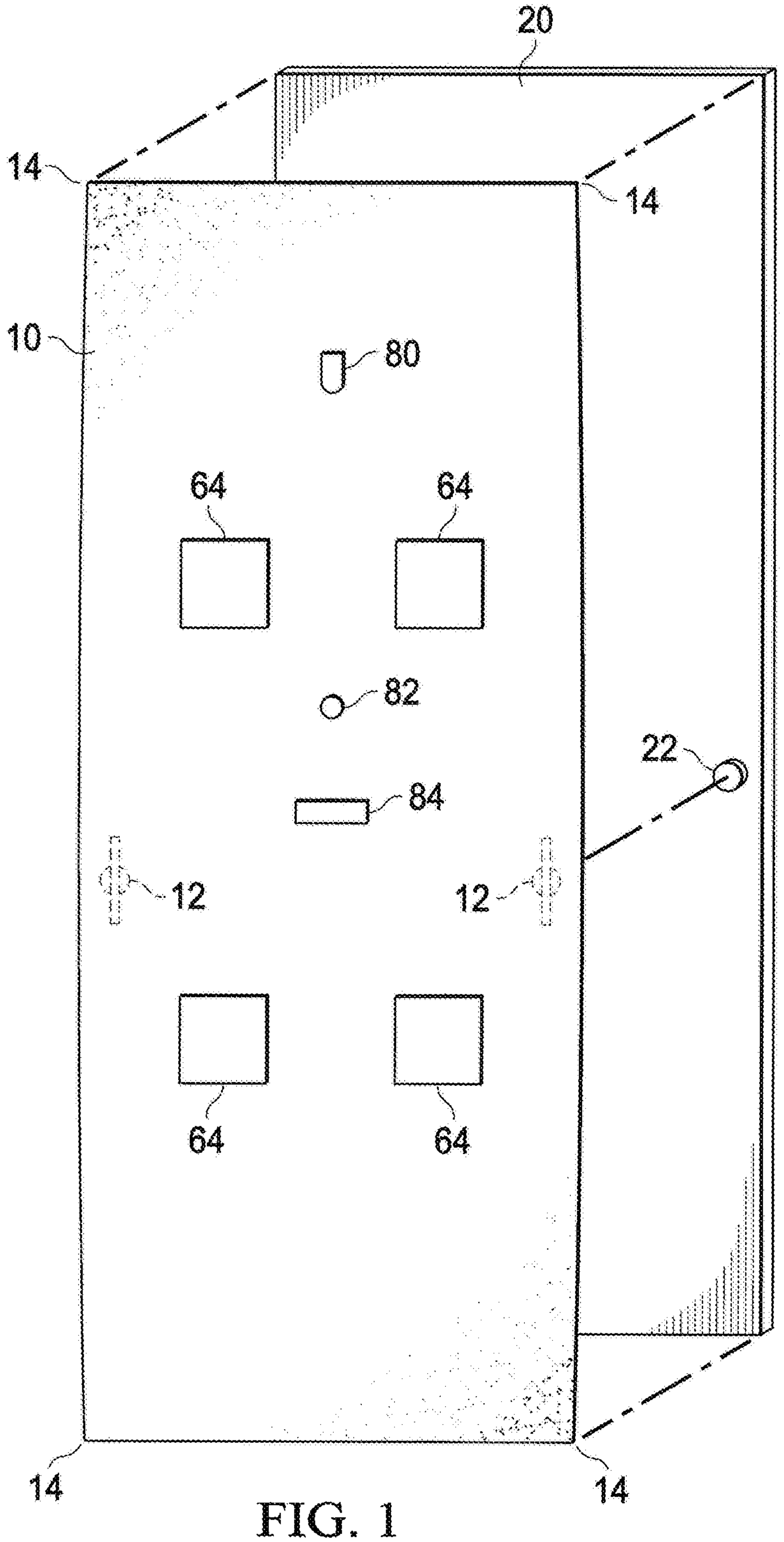
FIG. 1 illustrates one embodiment of the present invention that depicts the front side of a fabric panel or covering to be supported at each corner thereof on the corners of a door or a frame.

The invention described herein provides a way to decorate or cover a door or a frame with a decorative panel that is removable and leaves no damage or mark to be repaired. The invention can also be used to support any fabric or similar panel upon a door or frame to be installed in or attached to a wall, or otherwise supported on a free-standing structure such as a room divider. If a door is to be covered, the invention may be provided with designated pre-sewn door handle or doorknob openings that may be opened as needed by the end user. The panel or covering may generally be any thin, flexible material such as fabric, paper, or sheeting formed of woven or non-woven (e.g., spun-bonded), natural or synthetic fibers, extruded or calendered plastic film or sheet, leather, plastic, sheet metal, etc. In other embodiments the panel material may be transparent to enable visibility through a window in the door, for example. Still other panels may be formed of thin but rigid material. The elastic bands or straps may be fabric or rubber webbing or straps or like materials. Preferably the elastic straps are flat so that they will lay flat against the backside of the door or frame when the straps are looped or hooked around the corner of the door, or to allow the straps to fit within the space between the edge of the door and the door jam or frame when the door is closed.

One feature of the fabric panel that enables it to appear to exactly cover the door or frame without lapping over its edges or pulling away from the edges is to cut the panel material before hemming it to an outline that is slightly bowed outward midway between the corners of the material. Thus, the outline does not just conform to the rectangular perimeter of the door; rather, it is substantially rectangular but each of the sides are actually slightly curved outward. The amount of width or length added to the desired size by the bowed outline is small, typically less than one inch for a standard 36"×80" door size. This same technique may be used at the top and/or bottom of the panel although the increase in height will generally be proportionally less than is used across the width dimension of the panel. The purpose of the rounded sides or ends is to compensate for a slight amount of stretch at each corner of the fabric panel when its corners are attached to the door or frame. Thus, when installed, and the panel or covering is supported from the corners of the door or frame, for example, the edges of the panel or covering appear to be evenly aligned and the side, top, and bottom edges of the panel or covering appear to be straight.

There is essentially no limit to the variety of decorative effect that may be applied to the decorative panel or covering, nor to the methods or technique used to apply the decorative features to the panel or covering. Examples include painting, printing, drawing, including illumination such as from electro-luminescent materials, light-emitting devices such as light-emitting diodes (LEDs), etc. Thus, any manner of graphics, text, artwork, or other embellishments may be added to the surface of the panel. The images may be photographic, hand-drawn or painted, or printed by any number of technologies known in the arts. In other embodiments, the panel may include pockets for storing various types of articles, or configured with other functional features. Further, as will be described, features such as pockets, for storing objects, or hooks or fasteners of various kinds, may be attached to the panel for supporting other objects, as will be described.

FIG. 1 illustrates one embodiment of the present invention that depicts the front side of a fabric panel or covering to be supported at each corner thereof on the corners of a door or a frame 20. Materials for the panel 10 may vary widely but may include such materials as fabric of woven or spun-bonded, natural or man-made fibers, and leather, paper, and metal. Other materials may include transparent or translucent plastic, netting, materials having an open weave, and screening such as is used for screened doors and windows. Some panels 10 may even be formed of sheet metal or other rigid, thin material. An important factor in selecting the material for the panel or sheet is the degree of stretch that the material will exhibit when placed under tension. One form of tension is due to the weight of the material being hung from its upper corners on the door or frame. Another form of tension may arise from the corner attachments. Further, if other objects are attached to the panel or sheet material, the weight of such objects may also introduce tension into portions of the panel or sheet. The effect of tension is to cause dimensions to vary or distortions to occur in the material used for the panel or sheet material.

The decorative panel 10 shown in FIG. 1 includes optional sewn cutout outlines 12 on each side of the panel for a door handle or door knob. If provided or needed, the user may cut between the seams of the sewn cutout outline to prepare an opening for the handle or knob. It will be appreciated that if a frame is used it may be formed of wood or other sturdy material. It is even feasible to use the invention to attach and support a fine art painting or print on its own frame such as the canvas for an oil or watercolor painting, to name only two of the kinds of media used in a visual image. FIG. 1 also identifies the four corners 14 of the panel 10 that will be attached to a door or other frame 20 when in use. Depicted in FIG. 1 is a door 20 having a door knob 22 on the right side thereof. In other panels used for covering or decorating frames or framed objects without door handles, the features for accommodating door handles will not be required. Other features shown in FIG. 1 will be described later herein.

Figure 2:
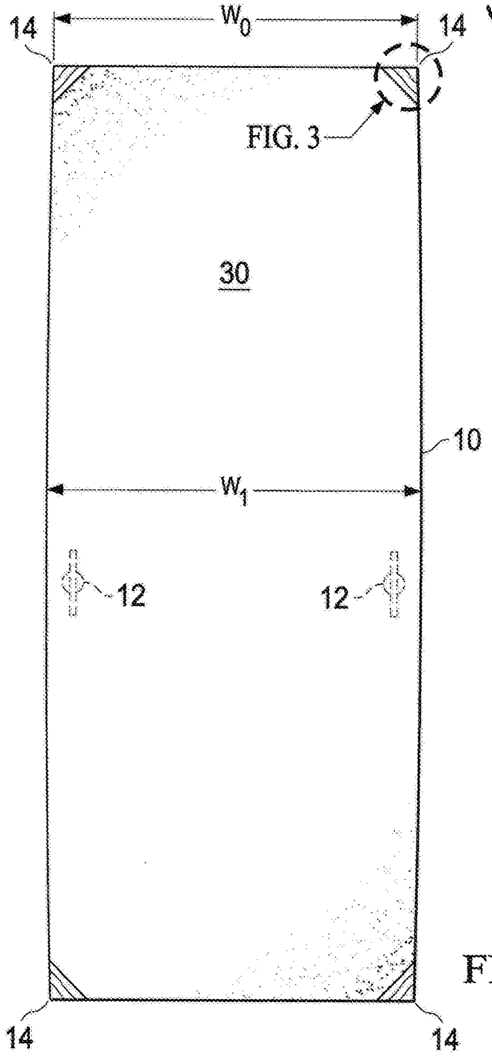
FIG. 2 depicts the back side of the fabric panel or covering of the embodiment of FIG. 1 to be supported at each corner thereof on the corners of a door or a frame.

FIG. 2 illustrates the back side 30 of the panel 10 to be supported at each corner 14 thereof on the corners of a door or a frame 20. For most fabrics and flexible or film materials it will necessary to form a hem along the edges of the sheet material. Hems, of course, are well known in the art and will not be described further herein. Also shown in FIG. 2 are the dimensions of the panel 10, with $W_0$ and $W_1$ respectively representing the width of the door or frame 20 at the top of the door, and the width measured half-way between the top and bottom of the panel 10. In the case of $W_1$ the difference $W_1-W_0$ will vary depending on the particular material used for the panel 10, but will generally be on the order of ¼ to ½ inch. In some embodiments, the width $W_1$ may be as little as ⅛ inch (or even less for rigid materials such as sheet metal having little or no tendency to stretch under moderate tension) or as much as two inches. However, there is no precise specification intended for the dimension $W_1$ because the materials used and the sizes of the door or frame may vary over a very wide range. Accordingly, some experimentation may be necessary. Numbers given herein are suggested dimensions. Further in FIG. 2, the spacing of the sewn cutout outlines 12 for the door handles from the edges of the panel 10 will depend on the particular door or frame 20 upon which the panel 10 will be installed.

Figure 3:
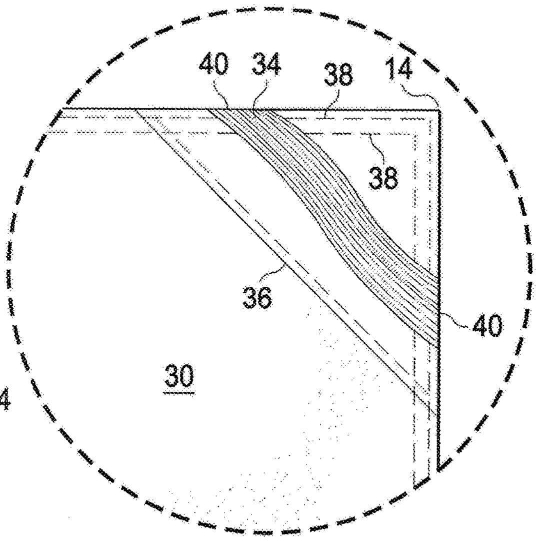
FIG. 3 illustrates a detail of the embodiment of FIG. 1 that depicts an elastic band or strap secured to the edges of the fabric panel, with the elastic strap shown with some excess length to provide for looping the strap around the corner of the door or frame.

FIG. 3 illustrates a detail of one corner 14 of the embodiment of FIG. 2 that depicts an attachment device 34, which may be formed as an elastic band or strap secured to the edges of the fabric panel 30, with the elastic strap shown with some excess length to provide for looping the strap 34 around the corner of the door or frame 20. The attachment device 34 may be elastic webbing or tape, for example. Each corner 14 of the panel 20 or covering will typically be identical with the detail shown in FIG. 3. FIG. 3 also illustrates a reinforcing gusset 36 sewn using stitches 38 or otherwise attached to a corner 14 of the fabric panel 10, for example when the fabric is very thin or lacks body. The material used for the gusset 36 should preferably have little or no tendency to stretch. The stitching 38 used to attach the gussets 36 to the panel 10 may preferably aligned approximately ¼ inch in from the edge of the panel 10; however, some embodiments may vary from this suggested spacing. The objective of the attachment device 34 is to provide a snug, smooth, and secure attachment of the decorative panel 10 to the door or frame 20, without the use of tools and without causing any damage to the surface of the door or frame 20.

Continuing with FIG. 3, it is preferred that each end 40 of the elastic band or strap used in this illustrative example as an attachment device 34 be attached to the back side 30 of the decorative panel 10 with some excess length included—usually not more than 50% more than the cut length of the strap, and generally no more than one times (1×) the thickness of the door or frame. This percentage will vary with the elasticity of the strap material and the thickness of the door or frame 20. It is also preferred that the elastic strap used as an attachment device 34 be oriented at right angles to the line bisecting the right angle of the corner of the door or frame 20 so that the attachment device 34 crosses the corner of the panel or covering 10 at an angle of approximately 45 degrees with the edges of the panel 10 and the door or frame 20. This requirement is necessary to ensure that the corners 14 of the panel 10 fit the corners of the door 20 properly and without misalignment. It is further preferred that the attachment device 34 at each corner 14 of the frame 20 provide sufficient tension toward the corners of the door or frame 20 to maintain the panel 10 in a smooth, uniform disposition on the frame 20. Finally, it is preferred that the ends of the strap be attached or sewn parallel to the edge of the fabric and inset from the edge approximately ¼ inch. This requirement facilitates the alignment of the panel 10 with the door 20.

Figure 5:
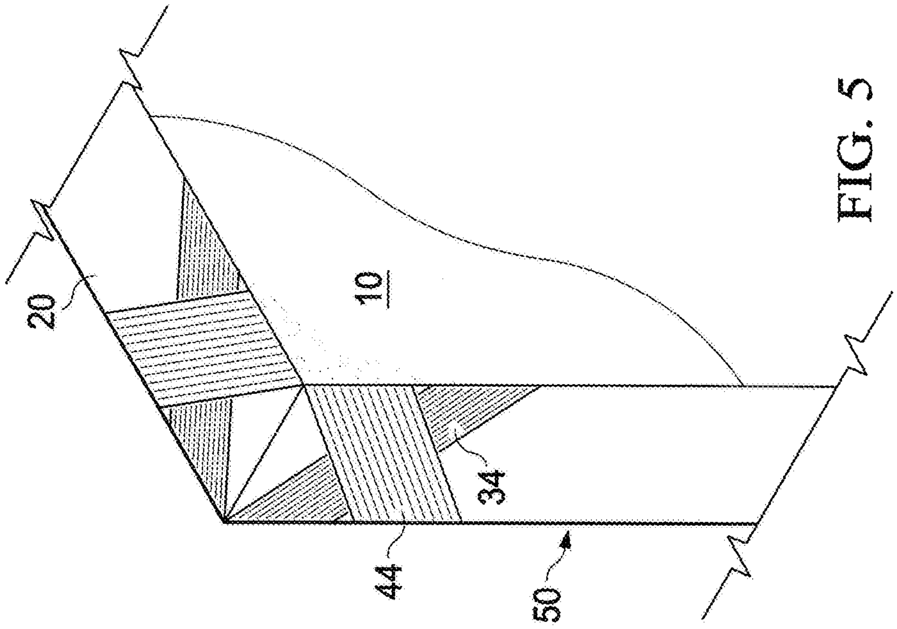
FIG. 5 illustrates a detail similar to the view in FIG. 4 except that two such fabric panels are depicted on a single door or frame, one panel on either side/face of the door or frame.
Figure 4:
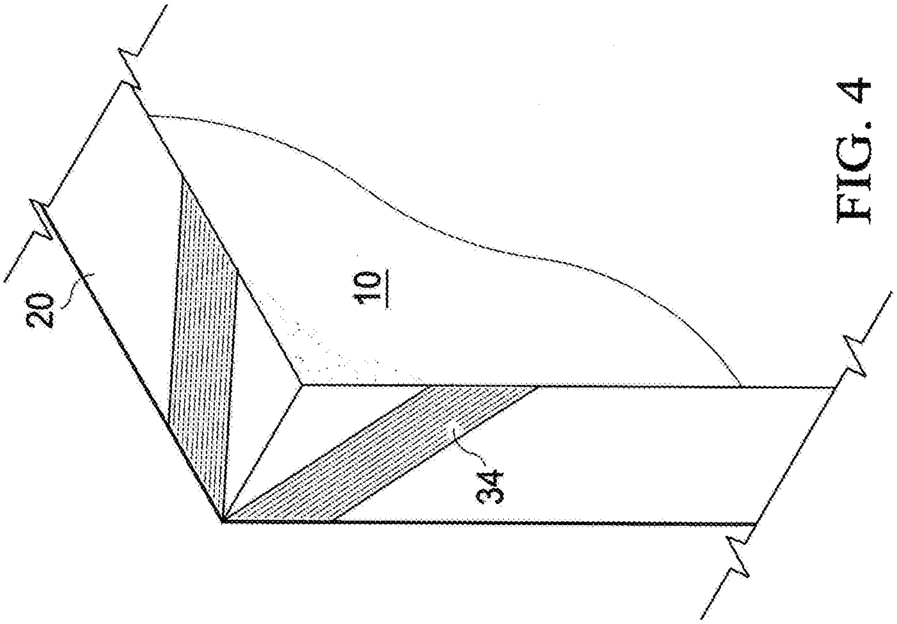
FIG. 4 illustrates a detail of the corner of a door or frame that depicts the elastic strap passed around the corner of the door or frame to support the corner of the fabric panel in alignment with the face of the door or frame corner.

FIG. 4 illustrates a detail of the corner of a door or frame 20 that depicts the elastic strap used as the attachment device 34 passed around the corner of the door or frame 20 to support the corner 14 of the fabric panel 10 in alignment with the face of the door or frame 20 corner. In similar fashion, FIG. 5 illustrates a detail similar to the view in FIG. 4 except that two such fabric panels 10 are depicted on a single door or frame 20, one panel 10 on either side/face of the door or frame 20. It will be noted that the use of flat, thin elastic webbing for the elastic straps or bands will enable the smoothest, best-aligned fit when a panel or covering 10 is installed on both sides of a door or frame 20.

Figure 7:
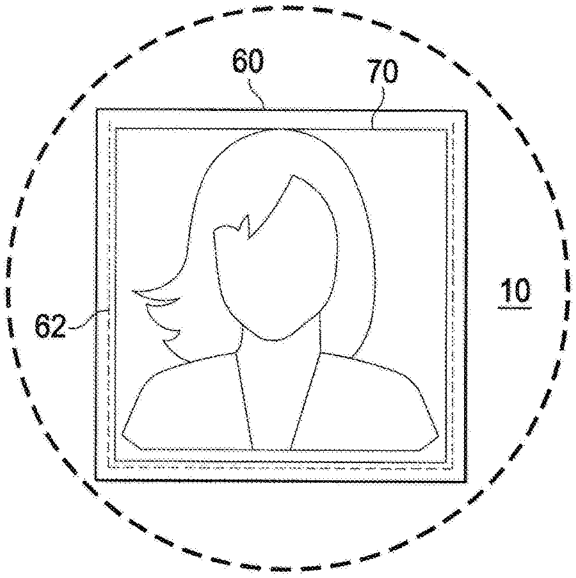
FIG. 7 illustrates a detail of a pocket shown in FIG. 6 for holding a photograph.
Figure 6:
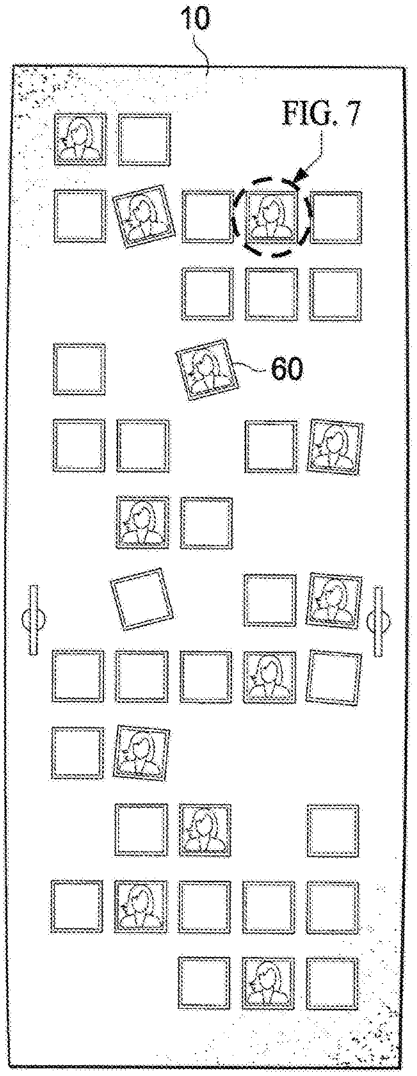
FIG. 6 illustrates an alternate embodiment of the fabric panel or covering that includes pockets affixed to the front surface of the panel for holding or storing objects therein.

FIG. 6 illustrates an alternate embodiment of the fabric panel or covering 10 that includes pockets 60 affixed to the front surface of the panel 10 for holding or storing objects therein. FIG. 7 illustrates a detail of a pocket 60 shown in FIG. 6 for holding a photograph 70. The illustrations in FIGS. 6 and 7 are just one of many variations that may be included on the decorative panel 10. There are many variations of pockets 60 that may be used. Other features that may be attached to the front of the panel 10 include loops or hooks 80, buttons or snap fasteners 82, zip fasteners or kook-and-loop fasteners 84, and the like. Further, additional features may be disposed on the facing surface of the panel 10 such as pockets 64 made of opaque material, overlays, graphics, text, and emblems as shown in FIG. 1.

The decorative panel 10 as described and illustrated above, may be constructed and installed according to the following illustrative method comprising the steps of:

(1) selecting a suitable frame having right angle corners and measuring its width, length, and thickness;

(2) selecting a material for the panel from the group consisting of a thin, flexible material;

(3) preparing the decorative panel to attach it to the frame or door including the steps of:

(a) shaping the outline of each side of the panel as a slightly outwardly curved line;

(b) adding a margin to the outline to allow for hemming the panel if the panel is formed of a fabric or paper material;

(c) cutting the material along the outline; and (d) folding the margin at each the corner to form a mitered corner and hemming each edge of the panel;

(4) selecting a flat, elastic strap material having a width approximately equal to at least ⅓ the thickness of the frame or door; and (5) attaching to the backside of the panel at each corner thereof a length of elastic strap disposed diagonally across the corner, wherein the length of the strap is sufficient to form a stretched loop around each respective corner of the frame or door.

While the invention has been shown in only one of its forms, as a graphic or decorative sheet for removably covering a door, it is not thus limited but is susceptible to various changes and modifications without departing from the spirit thereof. For example, the apparatus and method may be adapted to the support of any decorative sheet or panel, flexible or rigid, upon a frame for installation upon or in a wall, partition, sign, room divider, screen, whether indoors or out-of-doors, etc. The apparatus and method further provides for removably hanging or attaching or supporting a thin sheet of fabric or paper or metal or plastic, rigid or not rigid, that is decorated or undecorated, upon any frame or generally flat object that has corners such as a door. The invention may thus be used to conveniently change the decorative appearance of a door or wall panel hanging, for example, when the decor of the space that includes the door or wall is changed. Even fine art paintings and the like that are produced on canvas may be prepared according to the invention and removably hung upon a frame as an alternative to the conventional method of stapling the canvas to a wood frame. In another embodiment, the panel or covering may include pockets for storing various types of items. The pockets may be transparent for ease in viewing the stored contents of a pocket, such as photographs, postcards, and the like. The foregoing possibilities are not intended to be limiting but to suggest that other applications for the present invention may exist as intended.

What is claimed is:

1. A method for supporting a decorative panel upon a frame or door having right angle corners, comprising the steps of:

selecting a material for the decorative panel from the group consisting of a thin, flexible material;

preparing the decorative panel to attach it to the frame or door including the steps of:

compensating for material stretching by shaping the outline of each side edge of the panel as a slightly outwardly curved line such that the width of the decorative panel is greatest midway between end corners of the decorative panel;

cutting the material to size;

forming a mitered corner at each corner of the decorative panel; and attaching to the backside of the decorative panel at each corner thereof a length of elastic strap disposed diagonally across the corner, wherein the length of the strap is sufficient to form a stretched loop around each respective corner of the frame or door.

2. The method of claim 1, further comprising:
after shaping the outline of the decorative panel, adding a margin to allow for hemming the material along the outline; and
hemming each edge of the decorative panel.

3. The method of claim 1, wherein the outwardly curved line adds at least 1/10 inch to each side of the width of the decorative panel.

4. The method of claim 1, wherein attaching a length of elastic strap comprises the step of:
selecting a flat, elastic strap material having a width approximately equal to at least 1/3 the thickness of the frame or door.

5. The method of claim 1, wherein the step of compensating comprises the step of:
compensating for material stretching by shaping the outline of each top and bottom edge of the panel as a slightly outwardly curved line such that the height of the decorative panel is greatest midway between end corners of the decorative panel.

6. The method of claim 5, wherein the outwardly curved line adds at least 1/10 inch to each side of the width of the decorative panel.

7. The method of claim 1, wherein the step of selecting a thin, flexible material comprises the step of:
selecting a material from the group consisting of fabric, paper, leather, and sheeting formed of woven or non-woven natural or synthetic fibers.

8. The method of claim 1, wherein the step of selecting a thin, flexible material comprises the step of:
selecting a sheeting of extruded or calendered plastic film.

9. The method of claim 1, further comprising the step of:
applying decorative features to the decorative panel selected from the group consisting of photographic, painted, printed, and drawn features.

10. The method of claim 1, further comprising the step of:
attaching utility features to the decorative panel selected from the group consisting of pockets, hooks, and fasteners.

11. The method of claim 1, further comprising the step of:
forming openings in the decorative panel for doorknobs or handles.

* * * * *